(12) United States Patent
Schubert et al.

(10) Patent No.: US 7,240,170 B2
(45) Date of Patent: Jul. 3, 2007

(54) HIGH/LOW PRIORITY MEMORY

(75) Inventors: Richard P. Schubert, Medfield, MA (US); Christopher M. Mayer, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 396 days.

(21) Appl. No.: 10/786,994

(22) Filed: Feb. 25, 2004

(65) Prior Publication Data

US 2005/0188155 A1 Aug. 25, 2005

(51) Int. Cl.
*G06F 13/00* (2006.01)
*G06F 13/18* (2006.01)

(52) U.S. Cl. .................. 711/158; 711/151; 711/152; 712/262; 712/264

(58) Field of Classification Search ............. None
See application file for complete search history.

(56) References Cited

U.S. PATENT DOCUMENTS

| | | | | |
|---|---|---|---|---|
| 6,008,823 A | * | 12/1999 | Rhoden et al. | 345/541 |
| 6,038,645 A | * | 3/2000 | Nanda et al. | 711/141 |
| 6,553,473 B1 | * | 4/2003 | Gaskins et al. | 711/169 |
| 6,976,110 B2 | * | 12/2005 | Moyer et al. | 710/260 |
| 2002/0108021 A1 | * | 8/2002 | Syed et al. | 711/128 |
| 2003/0061445 A1 | * | 3/2003 | Birk et al. | 711/118 |
| 2003/0126365 A1 | * | 7/2003 | Jamil et al. | 711/120 |

\* cited by examiner

*Primary Examiner*—Jasmine Song
(74) *Attorney, Agent, or Firm*—Wolf, Greenfield & Sacks, P.C.

(57) ABSTRACT

Methods and apparatus are provided for achieving low latency for high priority tasks in digital processing systems. A digital signal processor includes a core processor and a level one memory. In some embodiments, a store buffer is configured to hold write information for the level one memory and for a level two memory. A write buffer is configured to hold write information, received from the store buffer, for the level two memory. The write buffer has a normal capacity and an excess capacity. A memory controller enables the excess capacity of the write buffer when a high priority task is being serviced and inhibits write access to the excess capacity of the write buffer when a high priority task is not being serviced. In other embodiments, the digital signal processor includes first and second fill buffers configured to hold read data in a fill operation. The memory controller steers low priority read data to the first fill buffer or the second fill buffer based on priority of the fill operation.

16 Claims, 8 Drawing Sheets

HIGH/LOW PRIORITY MEMORY

FIELD OF THE INVENTION

This invention relates to digital processing systems and, more particularly, to methods and apparatus for achieving low latency for high priority tasks in digital processing systems. The methods and apparatus are particularly useful in digital signal processors, but are not limited to such applications.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing, signal processing in wireless systems, and speech recognition. Digital signal processors are typically characterized by real-time operation, high interrupt rates and intensive numeric computations. In addition, digital signal processor applications tend to be intensive in memory access operations and to require the input and output of large quantities of data. Digital signal processor architectures are typically optimized for performing such computations efficiently.

Digital signal processors may include components such as a core processor, a memory, a DMA controller, an external bus interface and one or more peripheral interfaces on a single chip or substrate. The components of the digital signal processor are interconnected by a bus architecture which produces high performance under desired operating conditions. The bus architecture may be configured to provide data to the core processor at a rate sufficient to minimize core processor stalling.

The instruction set of a digital signal processor typically includes both microcontroller instructions and DSP instructions. DSP instructions may involve complex computations and may need to run in real time to process received samples. Microcontroller instructions typically access relatively slow regions of memory, such as off-chip memory, wherein a fetch may require hundreds of core cycles. If the processor switches from execution of microcontroller instructions to a high priority task, such as DSP computations, the pipeline is flushed and the slow process values are stored. Any data that is committed but not yet written to the slow memory may utilize a store buffer. If the store buffer is filled with slow traffic to external memory, the high priority task is not able to do any store operations. However, the first thing an interrupt handler typically does is store values to memory. It is desirable to minimize latency in servicing the high priority task.

Another source of latency in servicing high priority tasks is a cache line fill operation. In the event of a cache miss, a cache line fill operation is initiated. Information missing from the cache is read from slower memory to a line fill buffer and then is transferred into the cache. If the cache line fill operation is in process at the time of an interrupt, servicing of the interrupt may be delayed because the line fill buffer is needed to load an interrupt handler. The cache line fill operation could be aborted, but this would reduce the performance of other applications.

Accordingly, there is a need for methods and apparatus for achieving low latency in servicing high priority tasks in a digital signal processor.

SUMMARY OF THE INVENTION

According to a first aspect of the invention, a digital signal processor is provided. The digital signal processor comprises a core processor, a level one memory for operation with the core processor, a store buffer configured to hold write information, generated by the core processor, for the level one memory and for a level two memory, the store buffer having a store buffer capacity, and a write buffer configured to hold write information, received from the store buffer, for the level two memory. The write buffer has a normal capacity and an excess capacity. A memory controller is configured to enable the excess capacity of the write buffer when a high priority task is being serviced and to inhibit write access to the excess capacity of the write buffer when a high priority task is not being serviced. The digital signal processor may further include a second write buffer configured to hold write information for a level three memory and to receive the write information from the first write buffer.

According to a second aspect of the invention, a digital signal processor is provided. The digital signal processor comprises a core processor; a relatively fast memory for operation with the core processor; a store buffer configured to hold write information, generated by the core processor, for the relatively fast memory and for a relatively slow memory, the store buffer having a store buffer capacity; a write buffer configured to hold write information, received from the store buffer, for the relatively slow memory, the write buffer having a normal capacity and an excess capacity; and a memory controller configured to enable the excess capacity of the write buffer and to transfer contents of the store buffer to the write buffer when a high priority task is invoked and to inhibit write access to the excess capacity of the write buffer when a high priority task is not being serviced.

According to a third aspect of the invention, a method is provided for operating a digital signal processor. The method comprises providing a digital signal processor including a core processor, a level one memory for operation with the core processor, and a store buffer configured to hold write information for the level one memory and for a level two memory; providing a write buffer, configured to hold write information, received from the store buffer, for the level two memory, having a normal capacity and an excess capacity; enabling the excess capacity of the write buffer and transferring the contents of the store buffer to the write buffer when a high priority task is invoked; and inhibiting write access to the excess capacity of the write buffer when a high priority task is not being serviced.

According to a fourth aspect of the invention, a digital signal processor is provided. The digital signal processor comprises a core processor, a level one memory for operation with the core processor, a first fill buffer configured to hold read data in a fill operation, and a second fill buffer configured to hold read data in a fill operation. A memory controller is configured to steer read data to the first fill buffer or the second fill buffer based on priority of the fill operation.

According to a fifth aspect of the invention, a method is provided for operating a digital signal processor. The method comprises providing a digital signal processor including a core processor and a level one memory for operation with the core processor; providing first and second fill buffers for holding read data in a fill operation; and steering read data to the first fill buffer or the second fill buffer based on priority of the fill operation.

According to a sixth aspect of the invention, a digital signal processor is provided. The digital signal processor comprises a core processor; a level one memory for operation with the core processor; a store buffer configured to hold write information, generated by the core processor; a first write buffer configured to hold write information, received from the store buffer, for a level two memory; a second write buffer configured to hold write information, received from the store buffer, for a level three memory; and a memory controller configured to steer write information to the first write buffer or the second write buffer based on an address of a write operation.

According to a seventh aspect of the invention, a digital signal processor is provided. The digital signal processor comprises a core processor; a level one memory for operation with the core processor; a first buffer configured to hold write information, received from the core processor, for the level one memory; a second buffer configured to hold write information, received from the core processor, for a level two memory; and a memory controller configured to steer the write information to the first buffer or the second buffer based on an address of a write operation.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
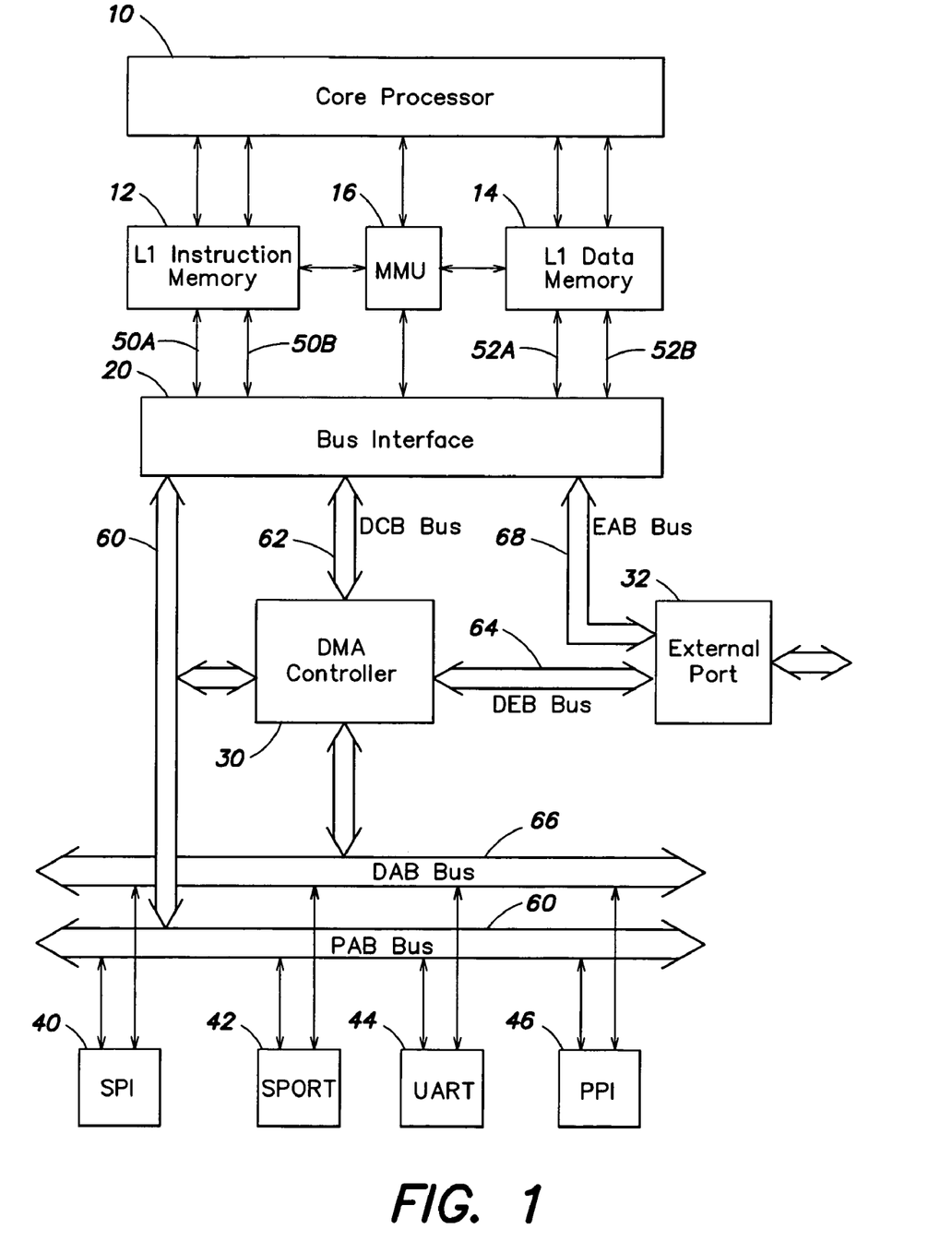
FIG. 1 is a block diagram of an example of a digital signal processor.

A block diagram of an example of a digital signal processor is shown in FIG. 1. The digital signal processor (DSP) includes a core processor 10, an L1 (level one) instruction memory 12, an L1 data memory 14, a memory management unit (MMU) 16 and a bus interface unit 20. In some embodiments, L1 instruction memory 12 may be configured as RAM or as instruction cache and L1 data memory 14 may be configured as RAM or as data cache. The DSP further includes a DMA controller 30, an external port 32 and one or more peripheral ports. In the embodiment of FIG. 1, the DSP includes a serial peripheral interface (SPI) port 40, a serial port (SPORT) 42, a UART port 44 and a parallel peripheral interface (PPI) port 46. The digital signal processor may include additional peripheral ports and other components within the scope of the invention. For example, the digital signal processor may include on-chip L2 (level two) memory.

Bus interface unit 20 is connected to L1 instruction memory 12 by buses 50A and 50B and is connected to L1 data memory 14 by buses 52A and 52B. A peripheral access bus (PAB) 60 interconnects bus interface unit 20, DMA controller 30 and peripheral ports 40, 42, 44 and 46. A DMA core bus (DCB) 62 interconnects bus interface unit 20 and DMA controller 30. A DMA external bus (DEB) 64 interconnects DMA controller 30 and external port 32. A DMA access bus (DAB) 66 interconnects DMA controller 30 and peripheral ports 40, 42, 44 and 46. An external access bus (EAB) 68 interconnects bus interface unit 20 and external port 32.

Figure 2:
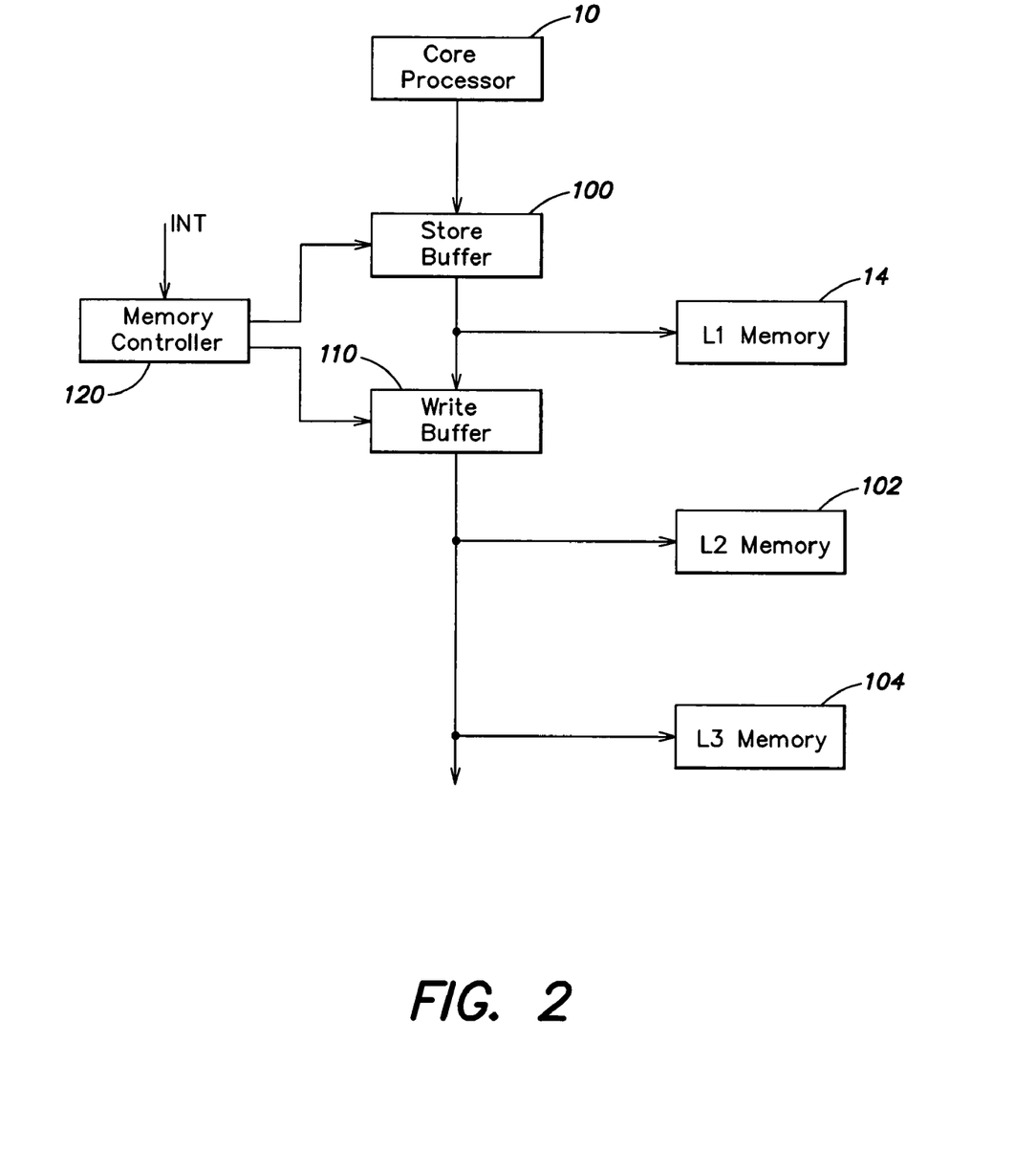
FIG. 2 is a block diagram of a digital signal processor in accordance with a first embodiment of the invention.

A block diagram of a digital signal processor in accordance with a first embodiment of the invention is shown in FIG. 2. Like elements in FIGS. 1 and 2 have the same reference numerals. Only the relevant components of the digital signal processor are shown. FIG. 2 shows the components involved in a store, or memory write, operation. As noted above, core processor 10 may execute microcontroller instructions and DSP instructions. Since DSP instructions may process data in real time, the memory system is required to respond rapidly.

In the case of memory writes, core processor 10 may deliver write addresses and write data at different times, depending on the operation of a pipelined execution unit. Memory write addresses are placed in a store buffer 100 until core processor 10 delivers the corresponding write data. The write address and the write data are combined in store buffer 100 to form a packet. If the write operation is directed to L1 memory 14, the write data is transferred from store buffer 100 to L1 memory 14 at high speed. A write to a level two memory 102, either on-chip or off-chip, or to an optional level three memory 104, is likely to be much slower than a write to L1 memory 14. The write address and the write data are transferred from store buffer 100 to a write buffer 110. The write from write buffer 110 to L2 memory 102 or L3 memory 104 is completed according to the speed of the target memory. The capacity of write buffer 110 is selected according to application to accommodate burst write operations.

As noted above, high priority tasks may be delayed if store buffer 100 is filled with writes that address slow memory when the high priority task is invoked. According to an aspect of the invention, write buffer 110 may be configured with a normal capacity and an excess capacity. Write access to the excess capacity is inhibited during execution of low priority tasks and is lo enabled when a high priority task, such as an interrupt, is invoked. After the excess capacity of write buffer 110 is enabled, the contents of store buffer 100 are transferred into write buffer 110, thus freeing store buffer 100 for use by the high priority task. When the high priority task is completed, the core processor is stalled for sufficient time to write the contents of write buffer 110 to L2 memory 102 or L3 memory 104 until the information held in the write buffer no longer uses the excess capacity. Then write access to the excess capacity of write buffer 110 is inhibited. A memory controller 120 controls the operations of store buffer 100 and write buffer 110.

In one embodiment, the excess capacity of write buffer 110 is equal to the effective capacity of store buffer 100. As used herein, "effective capacity" includes the size of store buffer 100 and any other upstream buffer. In cases where the full capacities of such buffers are not utilized, "effective capacity" includes the used capacity of store buffer 100 and any other upstream buffer. In general, the excess capacity of write buffer 110 should be approximately equal to or greater than the sum of the effective capacities of all buffers upstream of write buffer 110 in order to receive the contents of store buffer 100 and any other upstream buffers when the high priority task is invoked, even if the normal capacity of write buffer 110 is full at that moment. In some instances, the excess capacity of write buffer 110 can be less than the effective capacity of store buffer 100 if write buffer 110 can be unloaded with sufficient speed to accept the contents of store buffer 100 when the high priority task is invoked. In one embodiment, store buffer 100 has a capacity of six words, and write buffer 110 has a normal capacity of two words and an excess capacity of six words (total capacity of eight words).

Figure 3:
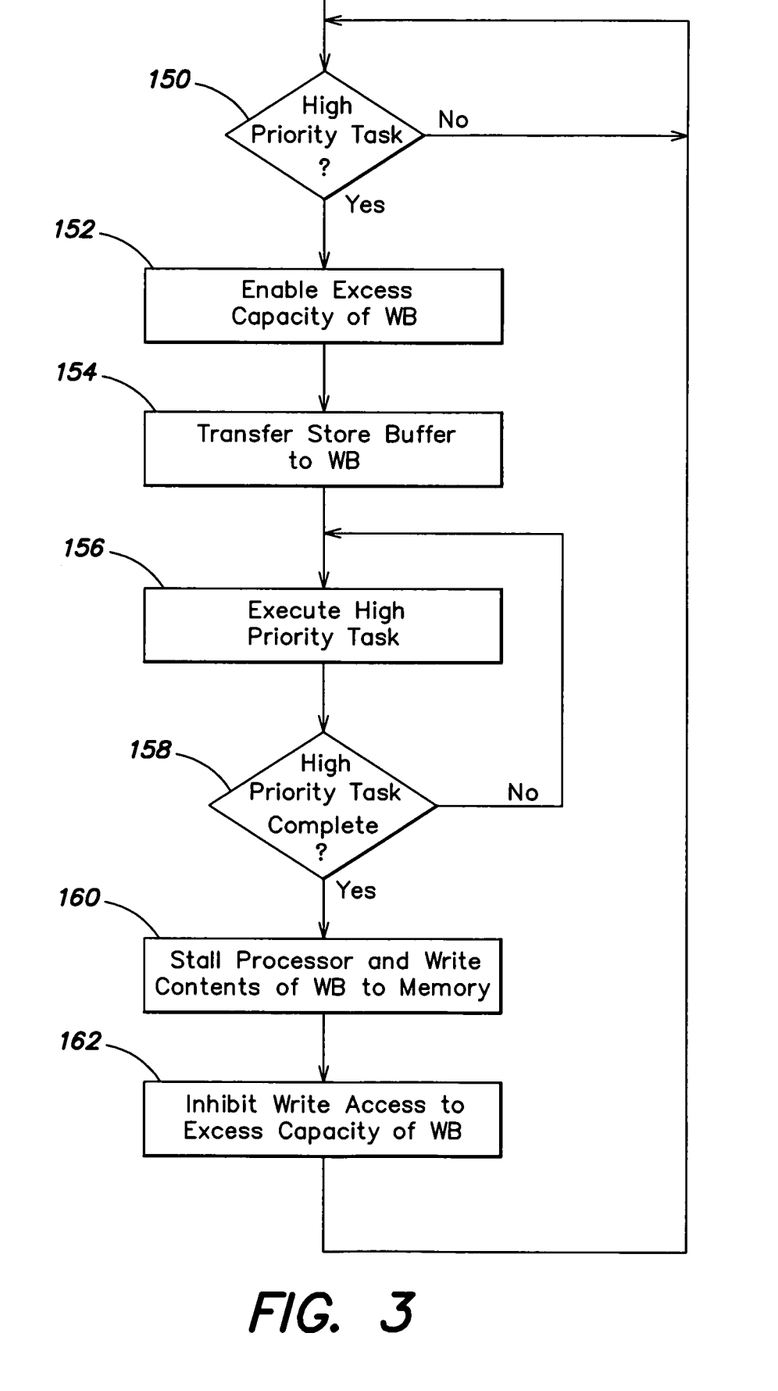
FIG. 3 is a flow chart that illustrates a process for operation of the digital signal processor of FIG. 2.

A process executed by memory controller 120 when a high priority task is invoked is shown in the flow diagram of FIG. 3. In step 150, a determination is made as to whether a high priority task, such as an interrupt, has been invoked. When a high priority task is invoked, the excess capacity of write buffer 110 is enabled in step 152. Then, the contents of store buffer 100 are transferred to write buffer 110 in step 154, making use of the excess capacity of write buffer 110. Since the excess capacity of write buffer 110 is enabled on receipt of the high priority task, write buffer 110 is ensured of having sufficient capacity to accept the contents of store buffer 100, even if write buffer 110 is filled to its normal capacity. In step 156, the high priority task is executed. In the case of an interrupt, data values may be written to L1 memory 14 using store buffer 100 at the beginning of the interrupt routine. Since store buffer 100 was emptied in step 154, no latency is involved. In step 158, a determination is made as to whether the high priority task is complete. If the high priority task is complete, core processor 10 is stalled in step 160 and the contents of write buffer 110 are written to memory until the information held in write buffer 110 no longer uses the excess capacity. According to a feature of the invention, when the core processor 10 is stalled following completion of the high priority task, L2 memory 102 and L3 memory 104 can be notified to increase the priority of the write operation, so as to limit the time that the core processor 10 is stalled. Nonetheless, the stall occurs after the high priority task is complete and thus does not impact critical performance. Write access to the excess capacity of the write buffer 110 is inhibited in step 162. The process then returns to step 150 and is available to service another high priority task.

Figure 2A:
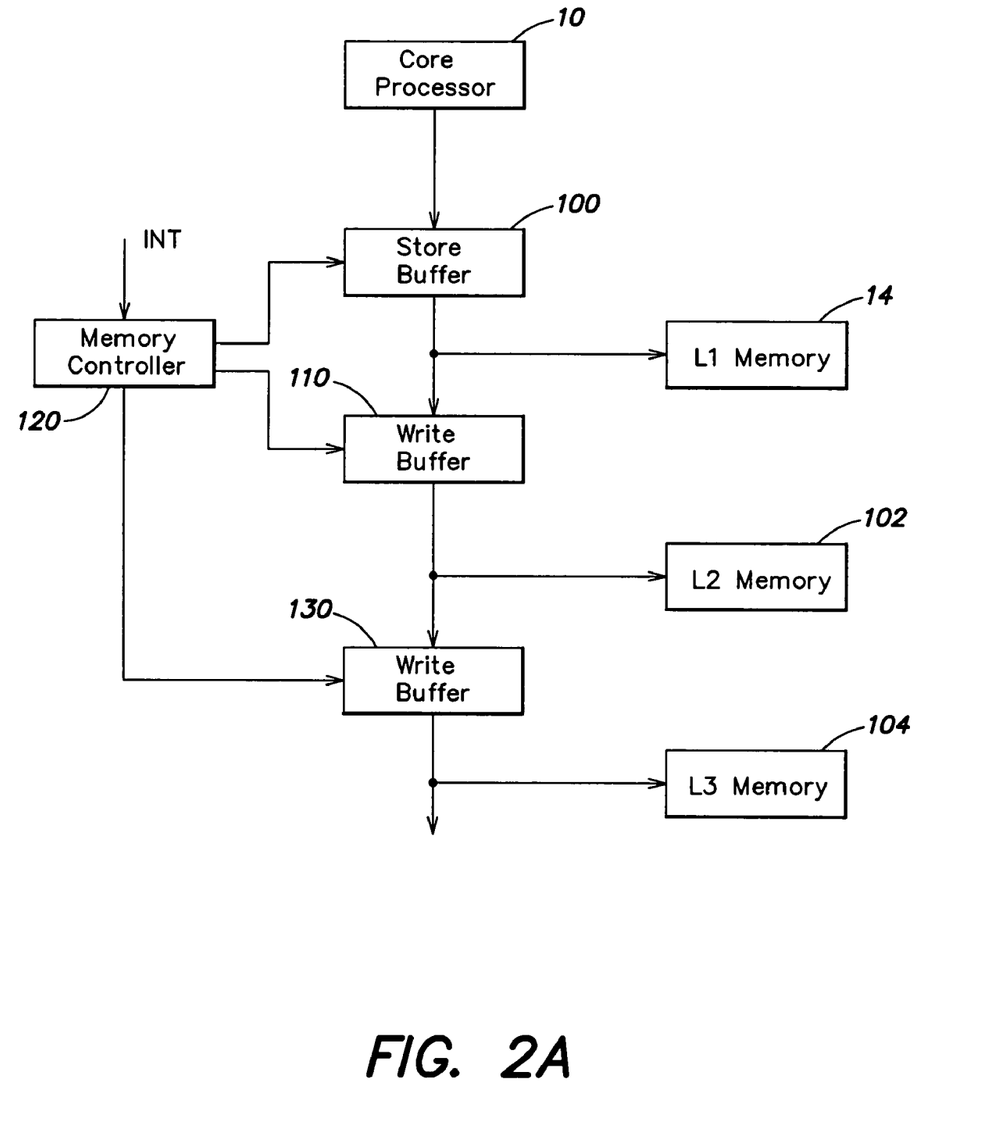
FIG. 2A is a block diagram of a digital signal processor in accordance with a second embodiment of the invention.

A block diagram of a digital signal processor in accordance with a second embodiment of the invention is shown in FIG. 2A. Like elements in FIGS. 1, 2 and 2A have the same reference numerals. The embodiment of FIG. 2A differs from the embodiment of FIG. 2 by the addition of a second write buffer 130 between L2 memory 102 and L3 memory 104. In this embodiment, writes to L3 memory 104 are directed through store buffer 100, write buffer 110 and write buffer 130. Write buffer 130 may be configured with a normal capacity and an excess capacity. Write access to the excess capacity is inhibited during execution of low priority tasks and is enabled when a high priority task, such as an interrupt, is invoked. The excess capacity of write buffer 130 should be approximately equal to or greater than the sum of the effective capacities of all buffers upstream of write buffer 130. Thus, the excess capacity of write buffer 130 should be approximately equal to or greater than the sum of the effective capacities of store buffer 100 and write buffer 110.

Figure 4:
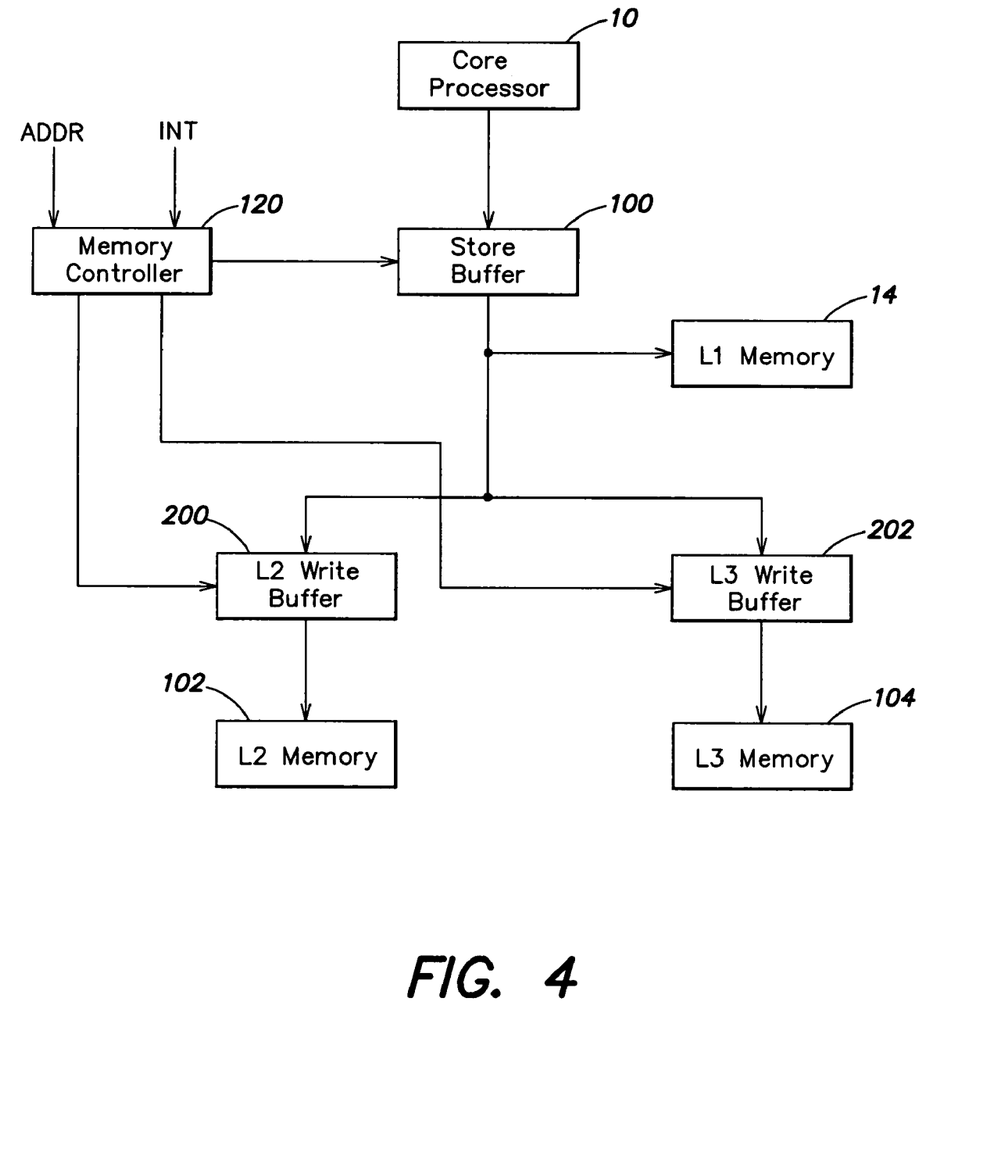
FIG. 4 is a block diagram of a digital signal processor in accordance with a third embodiment of the invention.

A digital signal processor in accordance with a third embodiment of the invention is shown in FIG. 4. Like elements in FIGS. 1, 2 and 4 have the same reference numerals. In the embodiment of FIG. 4, two or more write buffers are utilized to write to different memories in the memory hierarchy. In particular, a level two write buffer 200 services level two memory 102, and a level three write buffer 202 services level three memory 104. Additional write buffers can be utilized according to the memory architecture.

Write addresses and write data from store buffer 100 may be steered to level one memory 14, level two write buffer 200 or level three write buffer 202 according to the write address. Because the memory space is pre-assigned to the different memories, the write operations are automatically steered to the appropriate destination. By providing separate write buffers for each memory in the memory hierarchy, congestion of store buffer 100 is reduced and its availability for high priority tasks is increased. Furthermore, the contents of store buffer 100 can be transferred to the appropriate write buffer when a high priority task is invoked.

In some embodiments, each of level two write buffer 200 and level three write buffer 202 is configured with sufficient capacity to absorb burst write operations in a particular application, but is not configured with excess capacity. In other embodiments, either or both of level two write buffer 200 and level three write buffer 202 are configured with excess capacity as described above in connection with FIG. 2. The excess capacity is enabled when a high priority task is invoked to permit the contents of the store buffer 100 to be transferred to the respective write buffer. Write access to excess capacity of the write buffer is inhibited when a high priority task is not being serviced, in order to reserve this excess capacity for the high priority task. In one implementation, level two write buffer 200 does not have excess capacity because write operations to on-chip L2 memory 102 may be completed at high speed. In this implementation, level three write buffer 202 has excess capacity equal to the effective capacity of store buffer 100 so as to mitigate the effects of write operations to relatively slow external L3 memory 104.

In embodiments where one or both of write buffers 200, 202 have excess capacity, the process shown in FIG. 3 and described above can be utilized when a high priority task is invoked. In embodiments where both write buffers have excess capacities, the excess capacities are enabled when the high priority task is invoked, and the contents of the store buffer are transferred to the appropriate write buffer. Write access to the excess capacity of one or both write buffers is inhibited when a high priority task is not being serviced. It will be understood that more than two priority levels may be utilized and different actions taken for each priority level.

Figure 5:
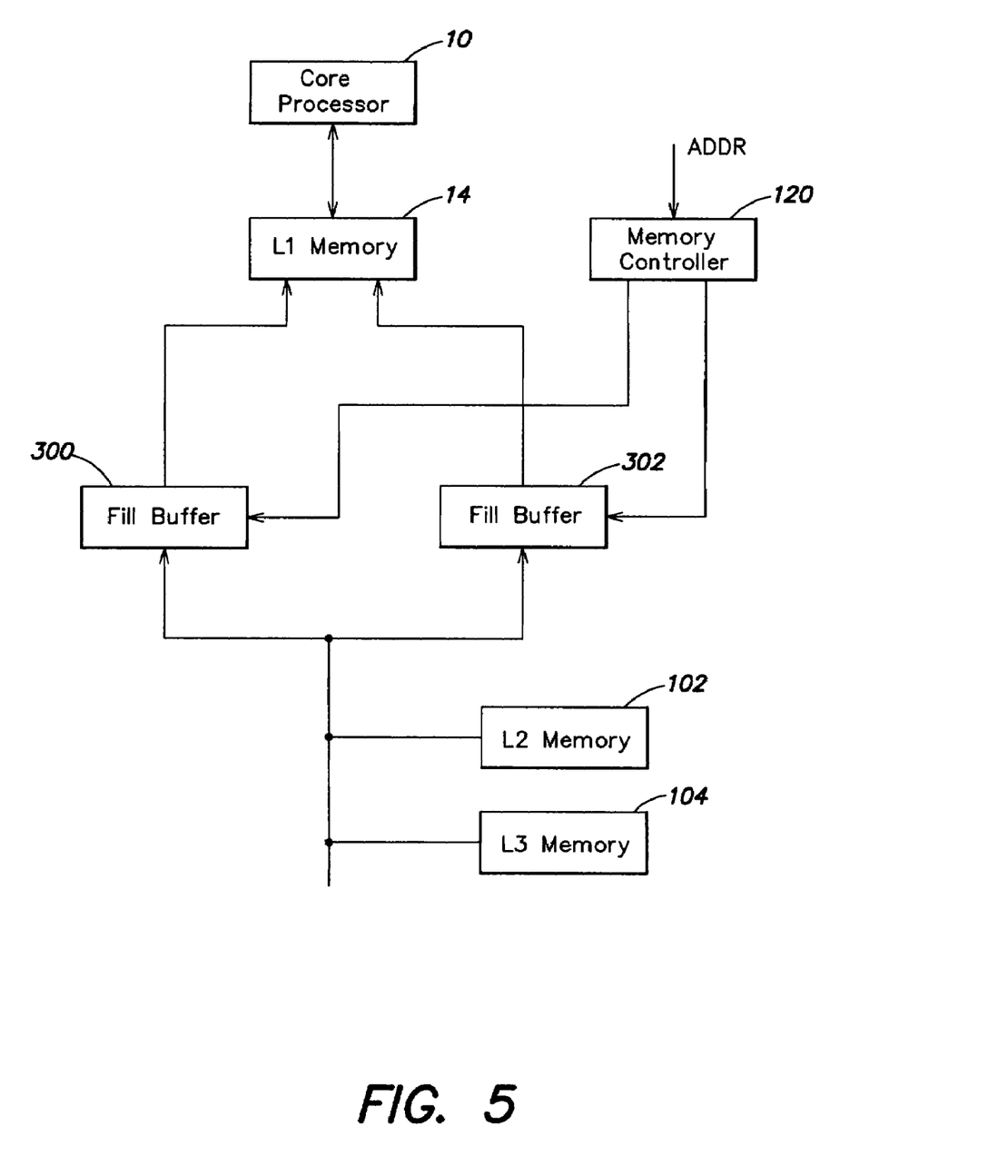
FIG. 5 is a block diagram of a digital signal processor in accordance with a fourth embodiment of the invention.

A digital signal processor in accordance with a fourth embodiment of the invention is shown in FIG. 5. Like elements in FIGS. 1, 2, 4 and 5 have the same reference numerals. The embodiment of FIG. 5 relates to reduction of congestion resulting from memory reads, which can impact the latency of high priority tasks. As known in the art, level one memory 14 may be a very high speed, small capacity memory which operates as a cache memory or as RAM (random access memory). Data is accessed by core processor 10 in L1 memory 14 with low latency. When L1 memory 14 is used as cache memory and the required data is not present, a cache miss occurs and a cache line fill operation is required. The cache line fill operation involves reading the required data from slower, larger capacity level two memory 102 or level three memory 104 and replacing a line in L1 memory 14. The line fill operation typically utilizes a line fill buffer between the slower memory and the high speed cache memory. In the case where L1 memory 14 is RAM, one word may be replaced in a fill operation. A fill buffer may also be utilized in this case.

If a high priority task, such as an interrupt, is invoked during a fill operation, servicing of the interrupt may be delayed. The fill operation can be aborted, but this may have an adverse impact on the performance of other applications.

According to the embodiment of FIG. 5, the digital signal processor is provided with two or more fill buffers. In the embodiment of FIG. 5, fill buffers 300 and 302 are utilized. Fill buffers 300 and 302 receive read data from level two memory 102 and level three memory 104 as described below and supply the read data to L1 memory 14. Fill buffers 300 and 302 are controlled by memory controller 120 based on the priority of the fill operation. The priority may be implemented in accordance with the read address, as described below. When a high priority task requires a fill operation, a fill buffer is available to perform the fill operation with low latency.

In one embodiment, a CPLB (cacheability protection lookaside buffer) descriptor is associated with each memory page. The CPLB descriptor may define the start address of the memory page and properties of the memory page. The properties may include page size, cacheable/non-cacheable and other properties. The CPLB descriptor may also include a priority indicator. The memory page may be marked as high priority, for example, if the page contains the code for an interrupt handler. Thus, a programmable priority indicator may be assigned to each memory page. The priority indicator may be utilized as described below in connection with FIG. 6. In another embodiment, fixed address ranges are utilized.

Figure 6:
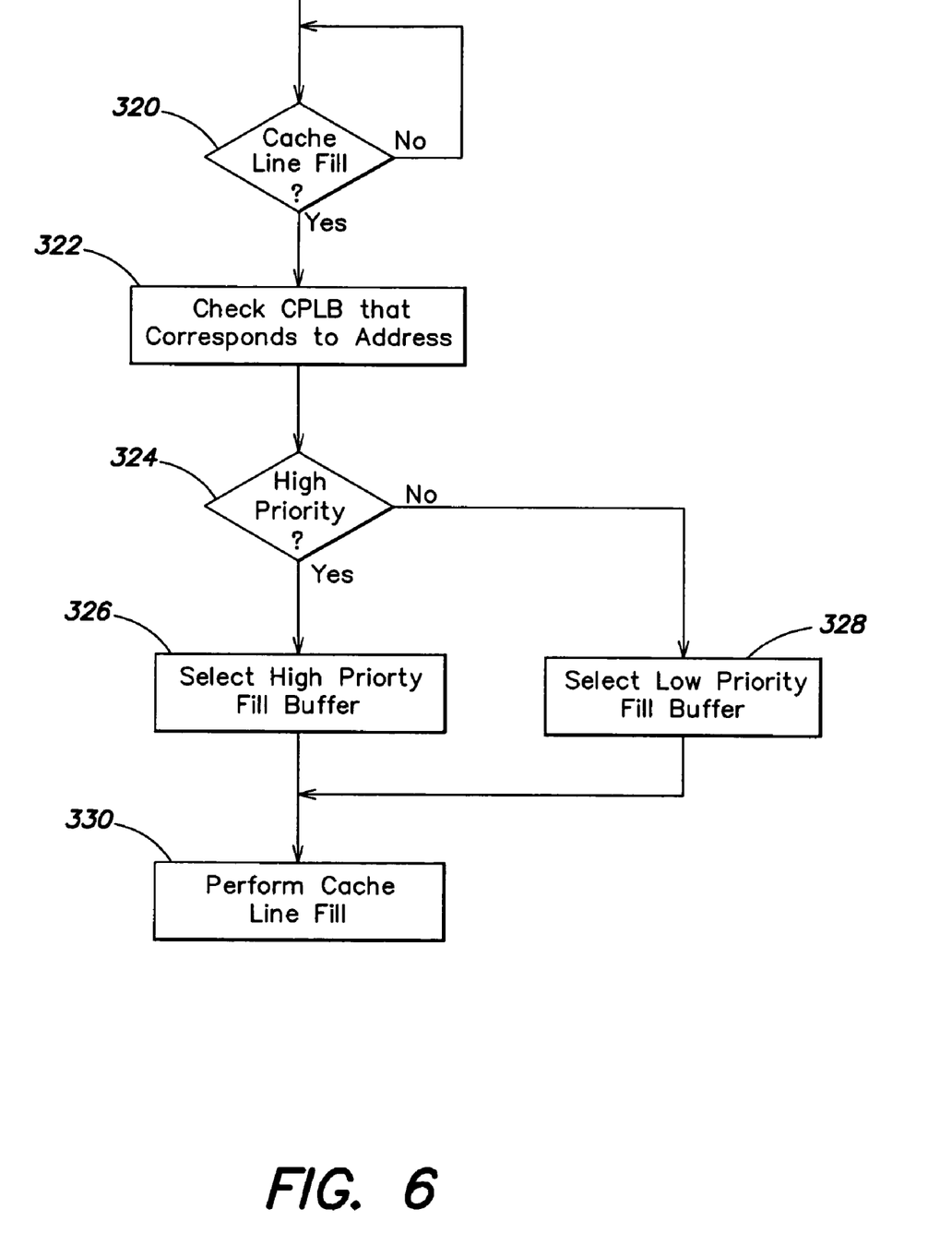
FIG. 6 is a flow chart that illustrates a process for operating the digital signal processor of FIG. 5.

A flow chart of an embodiment of a process for performing high priority and low priority cache line fill operations utilizing the digital signal processor of FIG. 5 is shown in FIG. 6. When a cache line fill operation is initiated in step 320, the memory address of the required cache line is generated. In step 322, memory controller 120 checks the CPLB descriptor of the memory page that contains the requested memory address and in particular checks the cacheability and priority fields. If the memory page is cacheable and high priority is indicated, as determined in step 324, a fill buffer is selected according to a selection criteria that is based on priority. In one approach, one of fill buffers 300 and 302 is utilized for low priority fill operations and the other of fill buffers 300 and 302 is used for high priority fill operations. In another approach, one of fill buffers 300 and 302 is used for low priority fill operations and any available fill buffer is selected for high priority fill operations. In general, the selection criteria is designed to ensure that a fill buffer is available when a high priority task is invoked. In the embodiment of FIG. 6, fill buffer 300 is designated as a low priority fill buffer and fill buffer 302 is designated as a high priority fill buffer. Thus, in step 326 fill buffer 302 is selected for the cache line fill operation. The cache line fill operation is performed in step 330 and latency due to the low priority line fill operation is avoided. When low priority is indicated by the CPLB descriptor in step 324, the low priority fill buffer 300 is selected in step 328. The cache line fill operation is performed in step 330 using the low priority fill buffer. If another line fill operation is in process, the low priority fill operation simply waits until low priority fill buffer 300 is available, thereby leaving fill buffer 302 available to perform a high priority fill operation.

Figure 7:
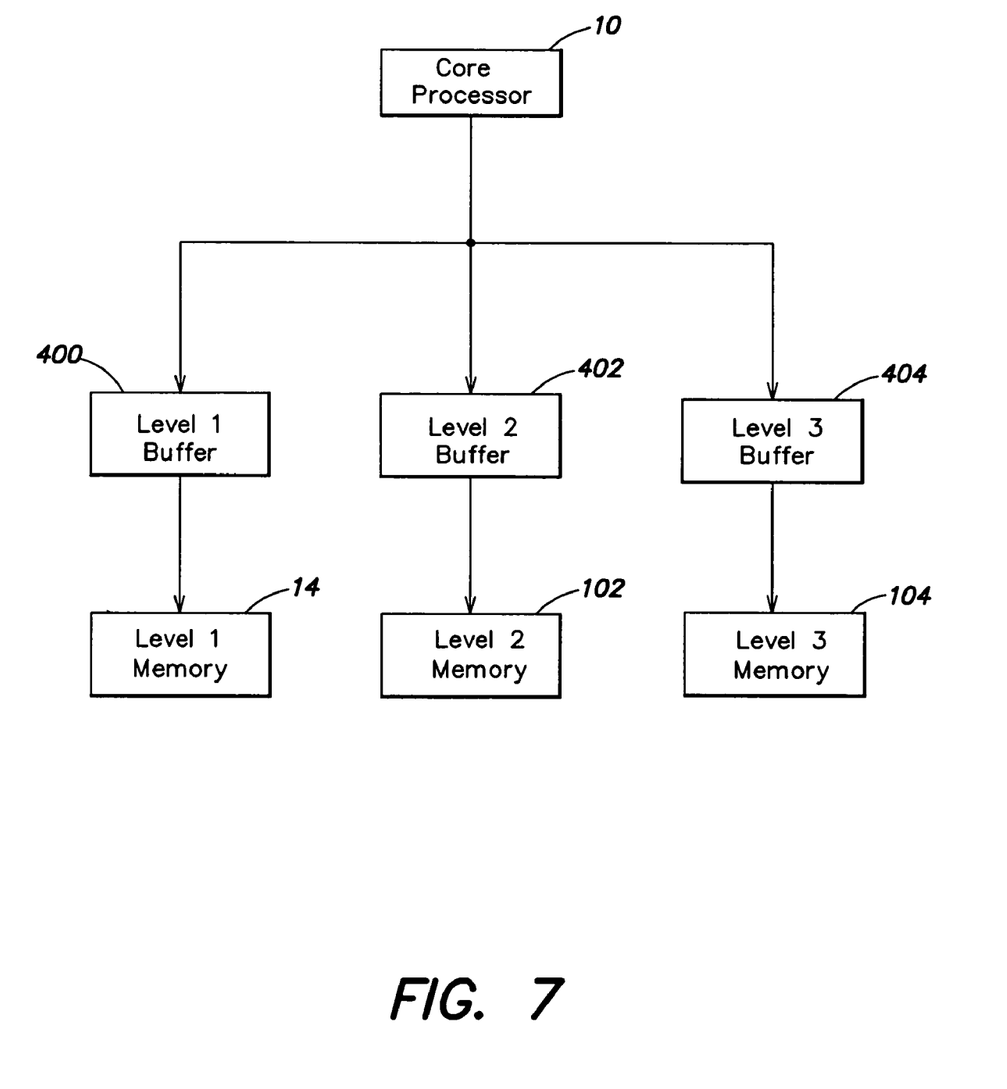
FIG. 7 is a block diagram of a digital signal processor in accordance with a fifth embodiment of the invention.

A digital signal processor in accordance with a fifth embodiment of the invention is shown in FIG. 7. Like elements in FIGS. 1, 2 and 7 have the same reference numerals. In the embodiment of FIG. 7, a separate buffer is utilized for write operations for each level memory in the memory hierarchy. Thus, a level one buffer 400 is associated with level one memory 14, a level two buffer 402 is associated with level two memory 102 and a level three buffer 404 is associated with level three memory 104. Each of buffers 400, 402 and 404 may include the functions of the store buffer and the write buffer as described above. The embodiment of FIG. 7 reduces congestion and latency for high priority tasks in comparison with prior art digital signal processors. However, this embodiment may involve a larger cost, in terms of chip area and circuit complexity, than the embodiments described above.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A digital signal processor comprising:
   a core processor;
   a level one memory for operation with the core processor;
   a store buffer configured to hold write information, generated by the core processor, for the level one memory and for a level two memory, the store buffer having a store buffer capacity;
   a write buffer configured to hold write information, received from the store buffer, for the level two memory, the write buffer having a normal capacity and an excess capacity; and
   a memory controller configured to enable the excess capacity of the write buffer when a high priority task is being serviced and to inhibit write access to the excess capacity of the write buffer when a high priority task is not being serviced.

2. A digital signal processor as defined in claim 1, wherein the high priority task is an interrupt handler.

3. A digital signal processor as defined in claim 1, wherein the excess capacity of the write buffer is equal to or greater than the effective store buffer capacity.

4. A digital signal processor as defined in claim 1, wherein the memory controller is configured to transfer the contents of the store buffer to the write buffer when the high priority task is invoked.

5. A digital signal processor as defined in claim 4, wherein the memory controller is configured to stall the core processor when the high priority task is completed and to write the contents of the write buffer to memory until the write information held in the write buffer no longer uses the excess capacity.

6. A digital signal processor as defined in claim 5, wherein the memory controller is configured to increase the priority of write operations to the level two memory when the core processor is stalled following completion of a high priority task.

7. A digital signal processor as defined in claim 1, further comprising a second write buffer configured to hold write information for a level three memory and to receive the write information from the first-mentioned write buffer.

8. A digital signal processor comprising:
   a core processor;
   a relatively fast memory for operation with the core processor;
   a store buffer configured to hold write information, generated by the core processor, for the relatively fast memory and for a relatively slow memory, the store buffer having a store buffer capacity;

a write buffer configured to hold write information, received from the store buffer, for the relatively slow memory, the write buffer having a normal capacity and an excess capacity; and a memory controller configured to enable the excess capacity of the write buffer and to transfer contents of the store buffer to the write buffer when a high priority task is invoked and to inhibit write access to the excess capacity of the write buffer when a high priority task is not being serviced.

9. A digital signal processor as defined in claim 8, wherein the high priority task is an interrupt handler.

10. A digital signal processor as defined in claim 8, wherein the excess capacity of the write buffer is equal to or greater than the effective store buffer capacity.

11. A digital signal processor as defined in claim 8, wherein the memory controller is configured to stall the core processor when the high priority task is completed and to write the contents of the write buffer to memory until the write information held in the write buffer no longer uses the excess capacity.

12. A digital signal processor as defined in claim 11, wherein the memory controller is configured to increase the priority of write operations to the relatively slow memory when the core processor is stalled following completion of a high priority task.

13. A method for operating a digital signal processor comprising:

providing a digital signal processor including a core processor, a level one memory for operation with the core processor, and a store buffer configured to hold write information for the level one memory and for a level two memory;

providing a write buffer, configured to hold write information, received from the store buffer, for the level two memory, having a normal capacity and an excess capacity;

enabling the excess capacity of the write buffer and transferring the contents of the store buffer to the write buffer when a high priority task is invoked; and inhibiting write access to the excess capacity of the write buffer when a high priority task is not being serviced.

14. A digital signal processor comprising:

a core processor;

a level one memory for operation with the core processor;

a store buffer configured to hold write information, generated by the core processor;

a first write buffer configured to hold write information, received from the store buffer, for a level two memory;

a second write buffer configured to hold write information, received from the store buffer, for a level three memory; and a memory controller configured to steer write information to the first write buffer or the second write buffer based on an address of a write operation, wherein at least one of the write buffers has a normal capacity and an excess capacity and wherein the memory controller is configured to enable the excess capacity when a high priority task is being serviced and to inhibit write access to the excess capacity when a high priority task is not being serviced.

15. A digital signal processor as defined in claim 14, wherein the high priority task comprises an interrupt handler.

16. A digital signal processor as defined in claim 14, wherein the excess capacity is equal to or greater than an effective capacity of the store buffer.

* * * * *